United States Patent [19]

Gill

[11] Patent Number: 5,207,381
[45] Date of Patent: May 4, 1993

[54] CALIBRATION OF FLUID DELIVERY EQUIPMENT

[75] Inventor: David C. Gill, Keynsham, Great Britain

[73] Assignee: Nomix Manufacturing Company Limited, Bristol, United Kingdom

[21] Appl. No.: 569,957

[22] Filed: Aug. 20, 1990

[30] Foreign Application Priority Data

Aug. 21, 1989 [EP] European Pat. Off. ........... 89308454
Feb. 20, 1990 [GB] United Kingdom ................ 9003775

[51] Int. Cl.⁵ .......................... B67D 5/08; B05B 3/10
[52] U.S. Cl. ...................................... 239/72; 239/67; 239/224; 73/861
[58] Field of Search .......................... 73/3, 865.9, 861; 239/65, 67, 70, 72, 71, 223, 224

[56] References Cited

U.S. PATENT DOCUMENTS

| | | | |
|---|---|---|---|
| 3,451,252 | 6/1969 | Horton et al. | 239/65 |
| 3,600,943 | 8/1971 | Blanchard | 73/861 |
| 3,605,481 | 9/1971 | Basler | 73/3 |
| 4,331,262 | 5/1982 | Snyder et al. | 73/3 |
| 4,389,886 | 6/1983 | Korczak | 73/3 |
| 4,530,465 | 7/1985 | Gauchet et al. | 239/159 |
| 4,690,326 | 9/1987 | Gill | 239/394 |
| 4,712,738 | 12/1987 | Gill | 239/74 |
| 4,722,478 | 2/1988 | Fletcher et al. | |
| 4,723,437 | 2/1988 | McKenzie | 73/3 |
| 4,799,142 | 1/1989 | Waltzer et al. | |
| 4,804,118 | 2/1989 | Mullen et al. | |
| 4,807,664 | 2/1989 | Wilson et al. | |
| 4,823,414 | 4/1989 | Piersimoni et al. | |
| 4,949,570 | 8/1990 | Harmon et al. | 73/3 |
| 4,964,307 | 10/1990 | Bryce | 73/861 |

FOREIGN PATENT DOCUMENTS

| | | |
|---|---|---|
| 269563 | 2/1992 | Australia . |
| 256744 | 2/1988 | European Pat. Off. . |
| 214117 | 8/1965 | U.S.S.R. . |
| 2172524 | 9/1986 | United Kingdom . |

*Primary Examiner*—Andres Kashnikow
*Assistant Examiner*—Christopher G. Trainor
*Attorney, Agent, or Firm*—Merchant, Gould, Smith, Edell, Welter & Schmidt

[57] ABSTRACT

Fluid delivery equipment comprises calibration circuitry which, in a calibration mode of operation, detects a time at which fluid is first caused to flow in the equipment, and provides an output signal a predetermined time thereafter. The output signal may be audible. The equipment is of the hand-held type, including a handset (2), incorporating a manually operable trigger (3), and a distribution head (8) connected to the handset and incorporating a manually operable variable flow restrictor.

The equipment may include means for setting a desired width of land which is to be sprayed, in which case, during a calibration mode, this desired width is used as an indicator of the desired flow rate and the predetermined time is adjusted accordingly.

31 Claims, 2 Drawing Sheets

CALIBRATION OF FLUID DELIVERY EQUIPMENT

This invention relates to the calibration of fluid delivery equipment, and is particularly, although not exclusively, concerned with the calibration of equipment for delivering herbicides.

Different herbicide formulations have different properties, and in particular may have different viscosities. As a result, where herbicide is fed through a restrictor to a distribution element for distribution over the ground, the flow rate through the restrictor will depend upon the formulation which is used. In addition, since the actual flow rate is sensitive to the dimensions of the equipment, the flow rate will tend to vary from one piece of equipment to another, even when they are set to give the same nominal flow rate.

Modern herbicides are highly effective, and very small quantities of them are required in order to produce the desired effect. Thus, for maximum effectiveness and efficiency, the rate of delivery of the herbicide must be controlled very accurately. In general, before a piece of fluid delivery equipment is used with a particular herbicide formulation, a calibration test is carried out. During this test, the nominal flow rate of the equipment is set to the desired flow rate as indicated on a manually operated valve. Then, the equipment is operated for a given period of time, as measured by the operator, and the amount of fluid delivered into a calibration vessel during that period of time is used to calculate the actual flow rate, which is then compared with the desired flow rate. The nominal flow rate set can then be altered if required. A calibration device for use in this method is disclosed in EP-A-0297803.

However, this method has the disadvantage that the duration of the calibration test is determined entirely by the operator. One disadvantage of this is that the operator is likely to choose a duration, such as one minute, which allows easy calculation of the flow rate following the test. However, such a duration may be unsuitable for other reasons. For example, the amount of fluid which flows in this time period may be too small to be measured accurately or too large to be contained in the calibration vessel. A second disadvantage is that the time must be measured by the operator using a stop watch. This means that, at the beginning of the test, the operator must operate the stop watch and the trigger on the handset simultaneously, and must concentrate sufficiently to operate the trigger on the handset to stop the fluid flow at the correct time at the end of the test.

A further disadvantage is that the operator must correlate the volume of fluid flowing into the calibration vessel in the predetermined time with a desired application rate of the herbicide over the ground. For this, he needs to take into account both the spray width and the travel speed of the equipment during spraying. This places a considerable burden on the operator, and creates a possible source of error.

The present invention seeks to provide apparatus which allows more accurate and reliable calibration to be carried out by removing the necessity for the operator to time the test.

According to a first aspect of the present invention, there is provided fluid delivery equipment comprising calibration circuitry which, in a calibration mode of operation, detects a time at which fluid is first caused to flow in the equipment, and provides an output signal a predetermined time thereafter. This output signal may take the form of an audible warning to the operator to indicate that the flow of fluid should be stopped, or may take the form of an electrical signal which automatically cuts off the fluid flow.

EP-A-0256744 discloses fluid delivery equipment comprising electrical circuitry to which, during a fluid delivery mode of operation, an electrical signal may be supplied to indicate a desired walking speed of the operator of the equipment. In the apparatus disclosed, there is provided an output means for supplying audible tones to the operator at a constant frequency, for example one tone every second, corresponding to the pacing frequency required in order to achieve the desired walking speed.

According to a second aspect of the present invention, there is provided fluid delivery equipment comprising electronic circuitry having first, second and third input means and an audible output means, wherein a signal may be supplied to the first input means indicative of either a first fluid delivery mode or a second calibration mode, wherein a signal may be supplied to the second input means indicative of a desired pacing frequency, wherein a signal may be supplied to the third input means to indicate that fluid has been caused to flow in the equipment, wherein an audible output is supplied from the audible output means indicative of the desired pacing frequency when the signal supplied to the first input means is indicative of the first fluid delivery mode, and wherein, when the signal supplied to the first input means is indicative of the second calibration mode, and a signal supplied to the third input means indicates that fluid has been caused to flow in the equipment, an audible output is supplied by the audible output means a predetermined time after fluid has first been caused to flow in the equipment.

As mentioned above, it is advantageous if the duration of the calibration test is such that the quantity of fluid which flows during a test is large enough to be accurately measured, yet small enough such that it does not exceed the capacity of the calibration vessel. Apparatus is known for fluid delivery, which is capable of delivering fluid to a strip of land which is of variable width. The desired width is set by the operator, and the speed of a spinning disc, which distributes the fluid, is set in accordance with the desired width. Of course, if the fluid is to be distributed over a wider area of land, it is also likely that the desired fluid flow rate will be somewhat higher.

According to a third aspect of the present invention, there is provided fluid delivery equipment including calibration circuitry having first and second inputs, the first input being adapted to receive an input signal indicative of the desired width of a strip of land to which fluid is to be delivered, and the second input being adapted to receive a signal indicating that, in a calibration mode of operation, fluid has been caused to flow in the equipment, wherein an output signal is provided a predetermined time after a signal is received at the second input, and wherein the predetermined time is calculated on the basis of the input signal received at the first input.

In preferred embodiments of all aspects of the invention, the equipment comprises a handset, incorporating a manually operable trigger, and a distribution head, connected to the handset by a tube through which fluid can flow and incorporating a manually operable variable flow restrictor.

A further problem which occurs frequently during the use of conventional hand-held spraying equipment to spray a strip of land is that the strip of land contains obstacles such as trees; the known equipment provides no assistance for the operator attempting to ensure that the ground around the base of such an obstacle receives the correct dose of herbicide.

Preferably, therefore, hand-held fluid delivery according to the present invention further comprises a handset, including a trigger and being adapted for connection to a supply of the fluid; a distribution head, connected to the handset by a tube through which the fluid can flow; and electronic control circuitry, wherein, in a first operation mode, fluid is caused or allowed to flow to the distribution head for as long as the trigger is depressed and wherein, in a second operation mode, fluid is caused or allowed to flow to the distribution head for a predetermined time when the trigger is depressed and, at the end of the predetermined time, a control signal is output.

For a better understanding of the present invention, and to show how the same may be brought into effect, reference will now be made, by way of example, to the accompanying drawings, in which.

Figure 1:
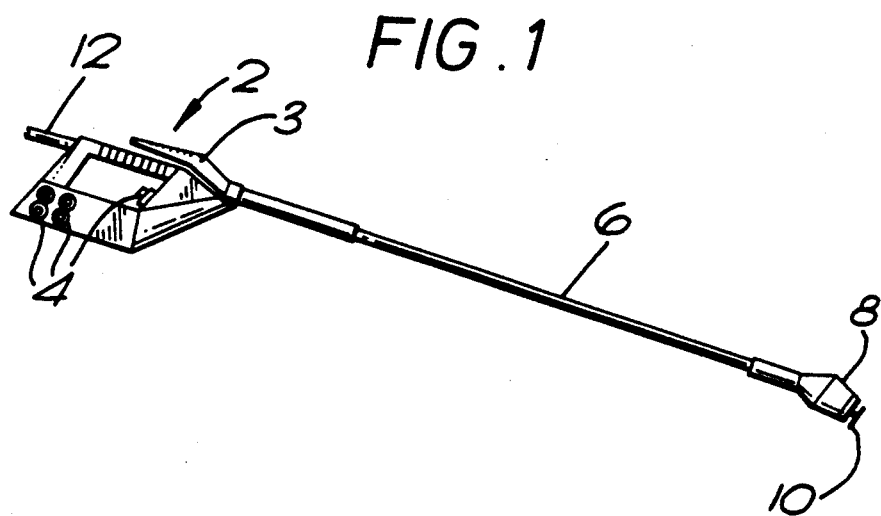
FIG. 1 shows fluid delivery equipment according to the present invention.
Figure 2:
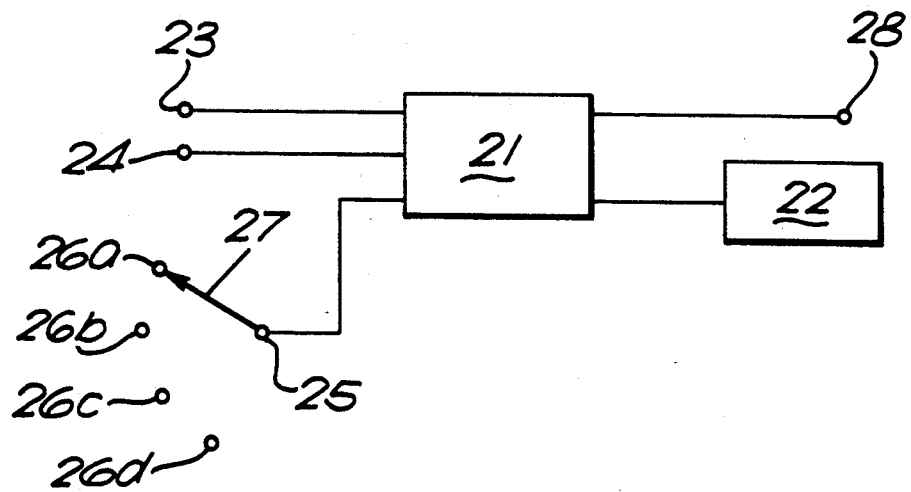
FIG. 2 is a block schematic diagram of the control circuitry for the equipment shown in FIG. 1.

The equipment shown in FIG. 1 comprises a hand-held herbicide delivery device, or lance, which is intended to be carried by an operator who walks over the ground which is to be treated. The lance-comprises a handset 2 which is provided with a trigger 3 and appropriate operating controls 4. A rigid support member in the form of a tube 6 extends from the handset 2 and carries a delivery head 8. The head 8 accommodates an electric motor for driving a spinning disc 10. The head 8 also accommodates a metering valve mechanism (not shown) for controlling the rate of flow of herbicide to the disc 10. A tube 12 extends from the handset 2 for connection to a herbicide container.

In use of the equipment shown in FIG. 1, actuation of the trigger 3 opens a valve (not shown) in the handset, to allow herbicide to flow from the tube 12 to the delivery head 8. Also, a microswitch (not shown) is operated by actuation of the trigger 3 to supply electrical power to the electric motor in the head 8. Herbicide thus flows through the tube 12, the handset 2 and the tube 6 to the head 8. From the head 8 the herbicide flows via the metering valve mechanism at a controlled rate to the spinning disc 10, which discharges the herbicide by centrifugal force to form droplets which fall on to the ground. As disclosed in EP-A-0110713, the speed at which the disc 10 spins, and hence the width of the strip of land which can be treated, is variable. The operator uses an appropriate one of the controls 4 in order to set the desired spray width, and the disc speed is then controlled as required.

Figure 3:
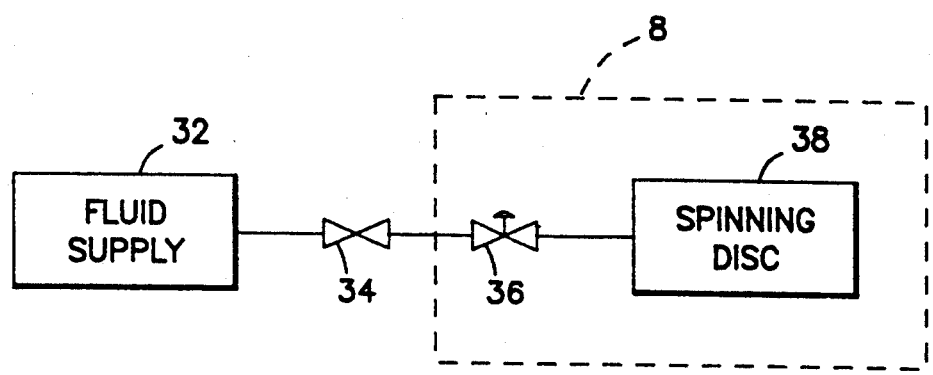
FIG. 3 is a block schematic diagram of the fluid flow through fluid delivery equipment according to the present invention.

FIG. 3 depicts a block schematic diagram of fluid flow through the fluid spraying equipment according to the present invention. As indicated there, the fluid supply 32 supplies fluid through valve 34. From valve 34, the fluid flows into the head 8 of the fluid spraying equipment. Head 8 includes a metering valve 36 in the fluid flow line before the spinning disk 38 to allow adjustment of the rate of fluid flow to the spinning disk 38.

Located within the equipment is electronic circuitry as shown schematically in FIG. 2, provided in order to allow the desired functions. A control circuit 21 is located in the handset 2 and is connected to an electric motor 22 which is located in the head 8 and is connected to the disc 10 in order to be able to cause it to rotate. Connected to the control circuit 21 are inputs 23, 24 and another either input 25 which is connected selectively by means of a switch 27 to inputs *26a*, *26b*, *26c*, *26d*. Also connected to the control circuit 21 is an output 28.

The input 23 is provided with the input signal from one of the controls 4, with which the operator sets the desired width which is to be sprayed. The input 24 is provided with a signal from a sensor, such as the microswitch controlling the motor in the head 8, which is positioned such that it can detect whenever the trigger 3 is depressed. The third input 25 is connected to a rotary switch 27, which has a plurality of selectable second positions corresponding to the inputs *26a*, *26b*, *26c*, *26d*. When the switch 27 is set to the first of these positions *26a*, the equipment is set in a calibration mode, and an appropriate signal is sent to the circuit 21. Each of the second positions *26b*, *26c*, *26d* corresponds to a desired pedestrian speed set by the operator and, when the switch 27 is set to one of these positions, the equipment is set in a fluid delivery mode and a signal corresponding to the desired pedestrian speed is sent to the control circuit 21. The output 28 is adapted to be connected to an audible tone generating device, and signals are sent from the control circuit 21 to the output 28 when it is desired to provide an audible tone as described below.

When first using the equipment, the operator uses the appropriate one of the controls 4 to indicate the desired width of land which he is going to wish to spray. A corresponding input signal is sent to the control circuit 21. Then, the operator manually adjusts the valve which is located in the head 8 and which restricts the flow of fluid. A calibration test is then carried out, with a calibration vessel being placed over the head 8, for example as described in EP-A-0297803. The rotary switch 27 is set by the operator to the first position *26a* in order to set the equipment into calibration mode. The trigger 3 is then depressed in order to allow fluid to flow from the container along the tube 12 and tube 6 to the head 8. When a signal is supplied from the input 24 to the control circuit 21, indicating that the trigger has been depressed, a timer circuit within the control circuit 21 begins to count down a predetermined time period which is set for the duration of the calibration test. If this predetermined time period is too large or too small, problems can arise, since the quantity of fluid which flows may be either too small to be measured accurately or too large for the volume of the calibration vessel. It is therefore advantageous if the predetermined time period can be calculated such that it bears some relation to the fluid flow rate which is expected. In the preferred embodiment, the signal which is supplied from the input 23, and which is indicative of the spray width, is used in this way. Of course, if a wider strip of land is to be sprayed, it is likely that a higher flow rate of fluid will be required, and so, in the preferred embodiment, the predetermined time which is used as the duration of the test is generally decreased with increasing desired spray widths. However, it is considered advantageous for this decrease not to be exactly inversely proportional, because otherwise an increased spraying width (implying increased flow rate) would result in a smaller volume being received in the calibration vessel during a calibration test. This would seem strange to the operator. Consequently, it is preferred to adjust the predetermined time period such that, in general, higher flow rates do give greater volumes of liquid during the calibration test. Thus, for example, if the desired spray width, and hence the desired fluid flow rate, is increased by a factor of 4, the duration of the calibration test may be reduced by a factor of 2.

An alternative approach is to select the predetermined time on the basis of the desired flow rate, such that, for every desired flow rate, an equal quantity of fluid should flow during the calibration test.

When the predetermined time is nearing its end, audible signals are emitted, by means of signals supplied to the output 28. The audible signals may take the form of two short tones, respectively two seconds and one second before the end of the predetermined time, and a long tone emitted as the predetermined time runs out. This is the signal for the operator to release the trigger and hence stop the test.

Alternatively, the signal supplied from the control circuit 21 to the output 28 may be adapted to be supplied to a valve, and hence to terminate the flow of fluid automatically after the expiry of the predetermined time.

When the calibration test has ended, the quantity of fluid delivered during the predetermined time is measured, and is compared with a quantity corresponding to the quantity which would have flowed if the actual flow rate had been equal to the desired flow rate. If these quantities are different, the valve on the head 8 can be manually adjusted, and a further calibration test can be carried out, in order to ensure that the actual flow rate is as close as possible to the desired flow rate. Once the flow rate has been set, by adjustment of the valve, the rotary switch 27 is set to the desired pedestrian speed which the operator intends to maintain during fluid delivery. Then, when a signal from the input 24 is supplied to the circuit 21, regular audible outputs are provided in order to make it easier for the operator to maintain the desired pedestrian speed, as is described in EP-A-0256744.

Thus, the equipment according to the present invention makes it easier for the calibration test to be carried out accurately by the operator, without requiring the use of additional input controls or complicated additional circuitry.

Once the calibration test is completed, the equipment is set into an operation mode. In a first operation mode, when the trigger 3 is depressed fluid begins to flow, and it continues to do so until the trigger is released. A second operation mode is intended to allow spraying around obstructions, such as trees, in the area to be sprayed. When such an obstruction is reached, the rotary switch 27 is used to set the equipment into the second operation mode. The inputs 23, 24 are then used to supply an input indicative of the size of the obstruction. For ease of operation, the user may perhaps be given a choice of three sizes, such as small, medium and large. It is also preferable to allow the user to indicate the required dose of the fluid which is being sprayed; however, the equipment may be pre-programmed with a dose rate which is close to the average for a herbicide, assuming a relatively high infestation rate, as is likely to be the case around the base of a tree.

When the trigger 3 is then depressed, fluid flows through the handset 2 to the delivery head 3 at a rate dependent upon the dose rate for a predetermined period of time dependent upon the size of the obstruction. When the predetermined period of time expires, a control signal is sent to the output 28 at which an audible output is provided, indicating that spraying should stop. For greater accuracy, four equally spaced audible tones may be provided, such that the user knows that one quarter of the circumference of the obstacle needs to be sprayed before the first tone, one quarter between the first and second tones, and so on.

This feature may also be included in spraying equipment in which the fluid is supplied from a pump. In such equipment, the control signal at the end of the predetermined time period may instead be supplied to the pump to cut off the supply automatically. In such equipment, the three audible tones to mark the ends of the first three quarters of the period may still be supplied.

Thus, the equipment allows the user to spray around obstacles such as trees without loss of accuracy of the dose rate supplied.

I claim:

1. Fluid delivery equipment comprising a handset, adapted for connection to a supply of a fluid; a distribution head, connected to the handset by a tube through which the fluid can flow from the handset to the distribution head; and a manually operable trigger, incorporated in the handset, by operation of which the flow of the fluid to the distribution head can be allowed or prevented; the equipment further comprising calibration circuitry which, in a calibration mode of operation, detects a time at which the trigger is operated such that the fluid is first caused to flow in the equipment, and provides an output signal a predetermined time thereafter.

2. Fluid delivery equipment according to claim 1, wherein the output signal takes the form of an audible warning to the operator to indicate that the flow of the fluid should be stopped.

3. Fluid delivery equipment according to claim 1, wherein the output signal takes the form of an electrical signal which automatically cuts off the fluid flow.

4. Fluid delivery equipment comprising calibration circuitry which, in a calibration mode of operation, detects a time at which the fluid is first caused to flow in the equipment, and provides an output signal a predetermined time thereafter, further comprising a handset, adapted for connection to a supply of the fluid; a distribution head, connected to the handset by a tube through which the fluid can flow from the handset to the distribution head under gravity when the equipment is held in an operating position; a manually operable variable flow restrictor, located on the distribution head, for adjusting the rate at which the fluid can be distributed; and a manually operable trigger, incorporated in the handset, by operation of which the flow of the fluid to the distribution head can be allowed or prevented.

5. Fluid delivery equipment according to claim 4, wherein the output signal takes the form of an electrical signal which automatically cuts off the fluid flow.

6. Fluid delivery equipment comprising a handset, including a trigger and being adapted for connection to a supply of a fluid; a distribution head, connected to the handset by a tube through which the fluid can flow; and electronic control circuitry which, in a calibration mode of operation, detects a time at which the fluid is first caused to flow in the equipment, and provides an output calibration signal a predetermined calibration time thereafter, wherein, in a first operation mode, the fluid is caused or allowed to flow to the distribution head for as long as the trigger is depressed and wherein, in a second operation mode, the fluid is caused or allowed to flow to the distribution head for a predetermined operation time when the trigger is depressed and, at the end of the predetermined operation time, a control signal is output.

7. Equipment as claimed in claim 6, wherein the fluid can flow from the handset to the distribution head under gravity when the equipment is in an operating position, further comprising a manually operable variable flow restrictor for adjusting the rate at which the fluid can be distributed, wherein the control signal is supplied to an audible output to provide an indication the delivery of the fluid should be stopped.

8. Equipment as claimed in claim 6, further comprising an electrically controlled pump for supplying the fluid, wherein the control signal is supplied to the pump to cause the delivery of the fluid from the pump to be stopped.

9. Equipment as claimed in claim 6, wherein, in the second operation mode, the control circuitry supplies a plurality of the control signals to an audible output at intervals throughout the predetermined operation time.

10. Fluid delivery equipment according to claim 6, wherein the output signal takes the form of an audible warning to the operator to indicate that the flow of the fluid should be stopped.

11. Fluid delivery equipment according to claim 6, wherein the output signal takes the form of an electrical signal which automatically cuts off the fluid flow.

12. Fluid delivery equipment as claimed in claim 6, wherein, in the first operation mode, pulsed audible signals are provided at a predetermined pulse frequency to serve as a guide for maintaining a desired striding rate.

13. Fluid delivery equipment as claimed in claim 6, wherein, in the second operation mode, the control signal is supplied to an audible output.

14. Fluid delivery equipment as claimed in claim 9, wherein, in the second operation mode, the control circuitry supplies the plurality of the control signals to the audible output at regular intervals.

15. Fluid delivery equipment as claimed in claim 9, wherein, in the second operation mode, the control circuitry supplies the plurality of the control signals to the audible output to indicate that the predetermined time is about to end.

16. Fluid delivery equipment comprising a handset, adapted for connection to a supply of a fluid; a distribution head, connected to the handset by a tube through which the fluid can flow from the handset to the distribution head; and a manually operable trigger, incorporated in the handset, by operation of which the flow of the fluid to the distribution head can be allowed or prevented; the equipment further including calibration circuitry having first and second inputs, the first input being adapted to receive an input signal indicative of the desired width of a strip of land to which the fluid is to be delivered, and the second input being adapted to receive a flow signal indicating that, in a calibration mode of operation, the fluid has been caused to flow in the equipment, wherein an output signal is provided a predetermined time after the flow signal is received at the second input, and wherein the predetermined time is calculated on the basis of the input signal received at the first input.

17. Fluid delivery equipment according to claim 16, wherein the output signal takes the form of an audible warning to the operator to indicate that the flow of the fluid should be stopped.

18. Fluid delivery equipment according to claim 16, wherein the output signal takes the form of an electrical signal which automatically cuts off the fluid flow.

19. Equipment as claimed in claim 16, wherein the fluid can flow from the handset to the distribution head under gravity when the equipment is held in an operating position; further comprising a manually operable variable flow restrictor, located on the distribution head, for adjusting the rate at which the fluid can be distributed.

20. Fluid delivery equipment comprising a handset, including a trigger and being adapted for connection to a supply of the fluid; a distribution head, connected to the handset by a tube through which the fluid can flow; and electronic control circuitry having first and second inputs, the first input being adapted to receive an input signal indicative of the desired width of a strip of land to which the fluid is to be delivered, and the second input being adapted to receive a flow signal indicating that, in a calibration mode of operation, the fluid has been caused to flow in the equipment, wherein, in a first operation mode, the fluid is caused or allowed to flow to the distribution head for as long as the trigger is depressed and wherein, in the calibration mode, the fluid is caused or allowed to flow to the distribution head for a predetermined time when the trigger is depressed and, at the end of the predetermined time, a control signal is output, the predetermined time being calculated on the basis of the input signal received at the first input.

21. Equipment as claimed in claim 20, wherein the fluid can flow from the handset to the distribution head under gravity when the equipment is in an operating position, further comprising a manually operable variable flow restrictor for adjusting the rate at which the fluid can be distributed, wherein the control signal is supplied to an audible output to provide an indication that delivery of the fluid should be stopped.

22. Equipment as claimed in claim 20, further comprising an electrically controlled pump for supplying the fluid, wherein the control signal is supplied to the pump to cause the delivery of the fluid from the pump to be stopped.

23. Equipment as claimed in claim 20, wherein, in the calibration mode, the control circuitry supplies a plurality of the control signals to an audible output at regular intervals through the predetermined time.

24. Fluid delivery equipment as claimed in claim 20, wherein the first operation mode, pulsed audible output signals are provided at a predetermined pulse frequency to serve as a guide for maintaining a desired striding rate.

25. Fluid delivery equipment comprising a handset, adapted for connection to a supply of a fluid; a distribution head, connected to the handset by a tube through which the fluid can flow from the handset to the distribution head; and a manually operable trigger, incorporated in the handset, by operation of which the flow of the fluid to the distribution head can be allowed or prevented; and further comprising electronic circuitry having first and second input means and an audible output means, wherein a signal may be supplied to the first input means indicative of either a first fluid delivery mode or a second calibration mode, wherein a flow signal may be supplied to the second input means to indicate that the fluid has been caused to flow in the equipment, wherein a pulsed audible output is supplied from the audible output means as an aid to the maintenance of a desired pacing frequency when the signal supplied to the first input means is indicative of the first fluid delivery mode, and wherein, when the signal supplied to the first input means is indicative of the second calibration mode, and the flow signal supplied to the second input means indicates that the fluid has been caused to flow in the equipment, an audible output is supplied by the audible output means a predetermined time after the fluid has first been caused to flow in the equipment.

26. Equipment as claimed in claim 25, wherein the fluid can flow from the handset to the distribution head under gravity when the equipment is held in an operating position; further comprising a manually operable variable flow restrictor, located on the distribution head, for adjusting the rate at which the fluid can be distributed.

27. Equipment as claimed in claim 25, wherein, when the trigger is depressed the fluid is caused or allowed to flow to the distribution head and the flow signal is supplied to the second input means of the electronic circuitry.

28. Equipment as claimed in claim 27, wherein the fluid can flow from the handset to the distribution head under gravity when the equipment is in an operating position, further comprising a manually operable variable flow restrictor for adjusting the rate at which the fluid can be distributed, wherein the control signal is supplied to an audible output to provide an indication that delivery of the fluid should be stopped.

29. Equipment as claimed in claim 27, further comprising an electrically controlled pump for supplying the fluid, wherein the control signal is supplied to the pump to cause the delivery of the fluid from the pump to be stopped.

30. Equipment as claimed in claim 27, wherein the control circuitry supplies a plurality of control signals to an audible output at regular intervals throughout the predetermined time.

31. Fluid delivery equipment according to claim 4, wherein the output signal takes the form of an audible warning to the operator to indicate that the flow of the fluid should be stopped.

* * * * *